United States Patent [19]

Rye

[11] Patent Number: 4,557,065
[45] Date of Patent: Dec. 10, 1985

[54] FISH HOOK AND LURE

[76] Inventor: Phillip H. Rye, 1701 Jefferson Ave., New Orleans, La. 70115

[21] Appl. No.: 568,783

[22] Filed: Jan. 6, 1984

[51] Int. Cl.[4] ............................................. A01K 83/06
[52] U.S. Cl. ................................... 43/43.16; 43/44.2; 43/44.8
[58] Field of Search ...................... 43/44.2, 44.4, 44.6, 43/44.8, 44.81, 44.82, 44.83, 44.88, 44.89, 42.34, 42.25

[56] References Cited

U.S. PATENT DOCUMENTS

| | | | |
|---|---|---|---|
| 1,152,698 | 9/1915 | Bonner | 43/44.8 |
| 2,797,522 | 7/1957 | Friedrich | 43/44.8 |
| 2,994,151 | 8/1961 | Webb | 43/42.34 |
| 2,995,857 | 8/1961 | Arff | 43/42.34 |
| 3,343,296 | 9/1967 | Davis | 43/42.34 |
| 3,855,722 | 12/1974 | Moore | 43/42.34 |
| 4,349,979 | 9/1982 | Strantz | 43/44.8 |

FOREIGN PATENT DOCUMENTS 571845  3/1959  Canada ................................. 43/44.8

Primary Examiner—Nicholas P. Godici
Assistant Examiner—M. Jordan
Attorney, Agent, or Firm—Keaty & Keaty

[57] ABSTRACT

An improved fishhook and lure includes strands of serrated sharp toothed filaments or similar material adjacent the hookeye, extending in a trailing direction coveringly around the shank and barb of the hook. Each of the serrated filaments presents a repeated extension of barbed teeth, where the barbs point toward the eye of the hook. The reversed engaging barbed sections on each of the filaments are flexible but have a relatively sharp edge and point. When the lure is engulfed by the mouth of a fish the action of the plurality of barbs will retard disgorgement and cause the lure to be readily ingested, so that the main hook will be ingested by the fish and may then be set. The improved fish lure will primarily be for still fishing, trot-line fishing or long line fishing; it may also be cast.

5 Claims, 2 Drawing Figures

FISH HOOK AND LURE

BACKGROUND OF THE INVENTION

This invention pertains to the field of art of fishing with lures or with natural bait containing hooks wherein an attractive appearing lure designed to appear as through it were a natural prey of a desired fish species is used.

As is known to the art, the standard fish hook comprises an elongate shaft. At one end is an eye for fastening to a lead or a line. At the other end the hook is curved in a right, reversing upon itself to form a sharp point for embedding within the mouth of a fish. The point is in turn equipped with a rigid reversed barb, preventing withdrawal of the hook once set beyond a certain point. This insures that the fish will remain firmly affixed to the hook and can be drawn in by means of pulling upon the line fastened to the eye of the hook member.

A particular problem with all fish hooks and lures is insuring that they will be adequately ingested by the fish so that the barb of the hook will be well within the mouth of the fish when the fisherman attempts to set it. Lures are deliberately made to be visually attractive to a fish or have natural or artificial bait placed on it to attract a fish. Several prior art inventions concentrate upon disguising the existence of the hook, improving the visual attractiveness of the lure such as by surfaces, or similarities to actual seaborn prey such as small squid, shrimp or small fish or insects. Other developments include providing hooks having a multiplicity of barbs, methods of increasing the sharpness of the barb, specific angles or pointing of the barb and the like.

All of these prior developments ignore the major problem in that whereas the fish may be visually attracted to the lure, once the lure is partially ingested, there would appear to be a significant tactal and taste difference between the lure and the actual prey. Anecdotal evidence indicates that many fish will taste a lure and then spit it out before it has been sufficiently ingested for the hook to be properly set; the fish may bite a natural bait in such a fashion that removes the bait without causing the hook to be ingested by the fish.

SUMMARY OF THE INVENTION

The instant invention relates to a covering for a fish lure and hook. While coverings for decorative purposes are well known to the art and other coverings have been developed for such purposes as deflecting weeds from the barb of the hook, the particular covering herein envisioned by this invention, is designed to provide, in combination, a disguising of the hook within the lure and, more importantly, to mechanically assist the ingestion of the lure within the mouth of the fish by increasing the difficulty of disgorgement.

The invention increases significantly the chances of engagement of the actual hooks within the body of the lure with the fish mouth. To achieve this, the invention comprises a series of elongate trailing reversed barb filaments which are firmly fastened to the shank of the hook in the vicinity of the hook eye and which extend covering the barb of the hook, to a distance beyond the extreme bight of the hook.

Each of these reversed barb filaments comprise in turn a strand with flexible, small, sharp "teeth" or barbs pointing toward the eye of the hook. The filaments are designed to drag rather than to bite into a skin or membrane surface and have the property that they slide much more easily in the direction the barbs lie while they significantly impede sliding in the direction opposite the lie of the barbs.

A fishhook with serrated filaments or a similar material having multiple small projections of a barb or pointed tooth-like nature which partly or totally cover the hook or bait, live or dead, natural or artifical cause the hook to be advanced into the fish's mouth when the fish bites or nibbles upon the bait or lure. The fishhook is primarily designed for still fishing, as in bottom fishing, long line fishing, trot line fishing, or fishing with a float. It may be trolled in clear water but would be subject to fouling in weed infested water.

Fish are known to steal bait. This invention will aid the fisherman in arresting this behavior in a fashion desirable to the fisherman by hooking the fish instead of having the bait stolen.

Should a fish engage the lure in its mouth for testing or tasting, the barbs will strongly resist the attempts of the fish to disgorge the lure and will, by the direction of their lie, urge the lure deeper within the mouth of the fish to a point where the hook is properly engaged within the mouth of the fish and the fish can then be caught.

It is thus an object of this invention to provide an attachment to a standard fish lure with hook that will significantly increase the resistance of the lure to disgorgement by a fish and strongly increase the tendency of the lure to engage itself within the mouth of the fish.

It is a further object of this invention to provide a covering or attachment for a lure with a hook which will shield the hook, increasing its natural appearance and visual desirablity to a fish.

It is a further object of this invention to prevent a fish from stealing bait from a hook without ingesting the hook.

This and other objects of the instant invention will be more clearly seen from the detailed description of the preferred embodiment below.

DETAILED DESCRIPTION OF THE PREFERRED EMBODIMENT

Figure 1:
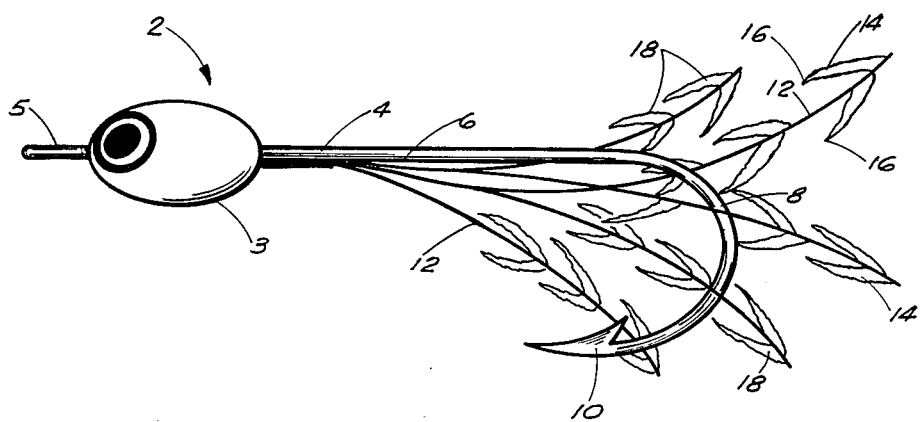
FIG. 1 is a side view of a lure with hook showing a preferred embodiment of the elongate reverse barb members extending covering the hook.

Turning to FIG. 1, the figure shows a typical lure 2 having a decorative and attractive body 3 which has been made to appear visually attractive to a fish. Within this lure is embedded a typical hook 4. The hook comprises an eye section 5 which is adapted for fastening to a fisherman's line (not shown) as is well known in the art extending aft from the eye a substantial distance, which establishes the overall general length of the hook 4, is the shank 6 which forms an attaching surface for the lure body 3 and as will be described later the elements of the current invention. The shank 6 runs aft terminating in a bight 8 which reverses the direction of the hook terminating the hook in a forward facing barb point 10, which, is well understood in the art for engaging by piercing the mouth of the fish. It is well understood that the overall purpose of the hook 4 is to, by piercing, engage fixedly into the mouth of a fish enabling the fish to be forceably withdrawn by means of pulling upon the line fastened to the hookeye 5.

Figure 2:
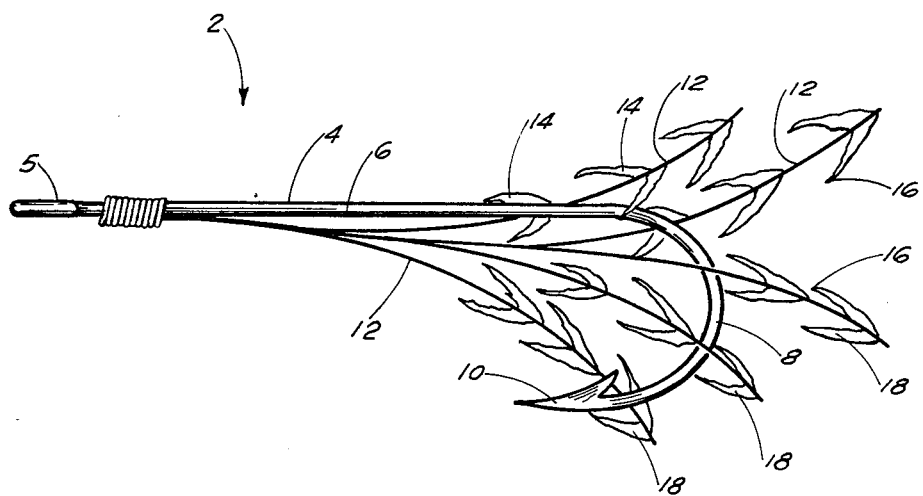
FIG. 2 is an alternative method of fastening the stems of the elongate barb members to the shank of a hook.

FIG. 2 likewise shows a hook 4, this time without a body 3 as it would be used for instance in trolling a live bait. It is well understood that under these circumstances the live bait, not shown for clarity, would be inserted by piercing the bait with the barbed point 10 thus sliding the bait up on the bight 8 and the shaft 6 of the hook 4.

Both FIGS. 1 and 2 show the instant invention comprising a plurality of filaments 12 fastened as by tying or by any other suitable means such as by adhesives to the shank 6 of the hook 4. Filaments 12 are of a substantial length trailing aft covering the bight 8 and point 10 of the hook terminating in an irregular pattern aft of the bight 8 of the hook 4 thus acting to conceal the overall visual outline of the hook 4. Each filament 12 has along its length a repeated plurality of serrated barbs 14, which cover substantially the entire length of the filament 12. The individual serrated barbs 14 in turn comprise an elongate semi-flexible structure having substantial stiffness but capable of being bent so as to conform with the motion of water and the ingestion of the overall lure 2 by the fish. Each barb 14 is constructed substantially longer than its maximum width. Each has a substantially sharp point 16 creating a lie or direction of the overall barbs 14 pointing forward towards the eye 5 of the hook 4. Each of the serrated barbs 14 has in addition a substantially sharp edge 18 running from the point 16 along the serrated barb 14 to the base of the filament 12.

The actual material of which the filaments 12 are constructed is relatively immaterial. In one version of the preferred embodiment of the invention the filaments are constructed of a repeated nylon structure or any suitably stiff plastic which may be readily constructed and which is capable of holding a relatively sharp point. It is important that the plastic have an overall flexibility, the construction of the filaments may be in the form of a folded or they may have an elongate rib structure so as to provide a degree of stiffness. The only restriction on filament 12 flexibility is that the filament must have a substantial resistance to being bent back upon itself and that the filament material must be capable of maintaining a relatively sharp catching surface along the edge 18 and the point 16. Otherwise, neither the edge 18 nor the point 16 need to be substantially smooth.

It is relatively important that each of the serrated barbs 14 be small with respect to the overall size of the filament 12 and that each of the barbs 14 be substantially longer than it is wide.

In operation, the lure 2 or the bare hook 4 with bait inserted as described above is fastened to a line (not shown) and trolled or otherwise placed in the water in the vicinity of the desired fish. The fish, being attracted by the smell, action or visual appearance of the lure 2 will approach the lure and mouth it in an attempt to determine its edibility. The plurality of serrated barbs 14 along the filaments 12 will lie flat against the filament as the fish ingest the lure partially. However, when the fish attempts to expel the lure, the flow of water and movement of the lure will engage the point 16 or the edges 18 against the mouth of the fish expanding the serrated barbs 14 causing them to catch firmly within the mouth of the fish. This action will prevent disgorgement of the filaments 12 and thus retain the lure 2 within the mouth of the fish.

As the fish moves its mouth in an attempt to disgorge the lure, the alternating expansion and contraction of the serrated barbs 14 coupled with the action of the point 16 and the edges 18 against the mouth of the fish will draw the lure 2 by means of drawing upon the filaments 12 further into the mouth of the fish until the hook point 10 is fully ingested into the mouth. At this point, the hook may be set by a sharp pull along the line as is well known to fishermen.

It is found that the inventive arrangement of filaments and barbs as described above significantly increases the ingestion of lures into the fish and significantly reduces the incident of fish removing the bait from the hook or taking and then disgorging a hook lure. It can be readily seen that the invention is susceptible to many alternate embodiments including changes in material and specific designs of filament and barb other than that described in the specific embodiment detailed above as an illustrative example. What is claimed as invention is the general invention disclosed, not restricted to the particular embodiment described above.

I claim:

1. An improved fish hook or lure for catching fish, comprising:
   a. a hook means, comprising a shaft extending in a first direction, curving in a bight to a point extending opposite to the first direction;
   b. a plurality of elongated flexible reversed serrated filaments attached to the shaft of the hook extending beyond the extension of the bight of the hook each filament having a plurality of reversed oppositely disposed barbs.

2. A lure as described in claim 1 above, wherein the improved fish hook or lure further comprises:
   a visually attractive body disposed about the shank of the hook.

3. A device for catching fish, comprising:
   a hook comprised of a shaft extending in a first direction, a bight curving into a hooking portion extending in a direction opposite to the first direction;
   a plurality of flexible, filaments disposed in surrounding relationship to the hooking portion of the hook, each filament being provided with a plurality of reversed oppositely disposed barbs pointed in a direction that urges a fish on to the hook.

4. The device of claim 3 wherein at least some of the filaments extend in a direction at an angle to the shaft.

5. The device of claim 4 wherein the filaments are substantially cylindrical.

* * * * *